US008428351B2

(12) United States Patent
Kondo

(10) Patent No.: US 8,428,351 B2
(45) Date of Patent: Apr. 23, 2013

(54) IMAGE PROCESSING DEVICE

(75) Inventor: Masaki Kondo, Toyoake (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 743 days.

(21) Appl. No.: 12/647,182

(22) Filed: Dec. 24, 2009

(65) Prior Publication Data

US 2010/0158369 A1 Jun. 24, 2010

(30) Foreign Application Priority Data

Dec. 24, 2008 (JP) .................. 2008-327426
Dec. 24, 2008 (JP) .................. 2008-327427

(51) Int. Cl.
*G06K 9/00* (2006.01)
*G06K 9/32* (2006.01)
*G06F 15/00* (2006.01)

(52) U.S. Cl.
USPC ........................... 382/167; 382/293; 358/1.9

(58) Field of Classification Search .................. 382/167, 382/293; 358/1.9
See application file for complete search history.

(56) References Cited

U.S. PATENT DOCUMENTS

| 5,289,295 | A | * | 2/1994 | Yumiba et al. ............. 358/518 |
| 5,710,872 | A | | 1/1998 | Takahashi et al. |
| 7,116,443 | B2 | | 10/2006 | Handley et al. |
| 7,379,204 | B2 | | 5/2008 | Kukao |
| 7,545,533 | B2 | | 6/2009 | Ok et al. |
| 2002/0114513 | A1 | | 8/2002 | Hirao |
| 2002/0126302 | A1 | * | 9/2002 | Fukao ............................ 358/1.9 |
| 2004/0017550 | A1 | | 1/2004 | Yasumi |
| 2004/0057614 | A1 | | 3/2004 | Ogatsu et al. |
| 2004/0151370 | A1 | | 8/2004 | Saski |
| 2004/0156544 | A1 | | 8/2004 | Kajihara |
| 2004/0165769 | A1 | | 8/2004 | Huh et al. |
| 2004/0240749 | A1 | | 12/2004 | Miwa et al. |

(Continued)

FOREIGN PATENT DOCUMENTS

| JP | H05-300531 | 11/1993 |
| JP | 8-321957 | 12/1996 |

(Continued)

OTHER PUBLICATIONS

U.S. Office Action dated Dec. 3, 2012 received in related U.S. Appl. No. 12/647,164.

(Continued)

*Primary Examiner* — Anand Bhatnagar
*Assistant Examiner* — Soo Park
(74) *Attorney, Agent, or Firm* — Scully, Scott, Murphy & Presser, P.C.

(57) ABSTRACT

An image processing device may create corrected image data by correcting object image data by utilizing base image data. The image processing device may determine a first polar coordinate value which represents first pixels in the object image data, calculate a first orthogonal coordinate by executing an orthogonal transformation on the first polar coordinate value, determine a second polar coordinate value which represents second pixels in the base image data, calculate a second orthogonal coordinate value by executing an orthogonal transformation on the second polar coordinate value, and create the corrected image data by correcting the object image data such that a coordinate value of each particular pixel in the object image data approaches the second orthogonal coordinate value. The each particular pixel may be included in a surrounding area of the first orthogonal coordinate value.

9 Claims, 15 Drawing Sheets

U.S. PATENT DOCUMENTS

| | | | |
|---|---|---|---|
| 2006/0222242 A1 | 10/2006 | Hayaishi | |
| 2006/0232801 A1 | 10/2006 | Hoshii | |
| 2007/0296986 A1* | 12/2007 | Watanabe et al. | 358/1.9 |
| 2008/0174796 A1 | 7/2008 | Yoo | |
| 2008/0231921 A1* | 9/2008 | Dokuni | 358/520 |
| 2008/0304739 A1* | 12/2008 | Sasaki | 382/167 |
| 2009/0002738 A1 | 1/2009 | Kondo et al. | |
| 2009/0009525 A1* | 1/2009 | Hirashima et al. | 345/589 |
| 2009/0060326 A1 | 3/2009 | Imai et al. | |
| 2009/0092297 A1 | 4/2009 | Kitoh | |
| 2009/0103805 A1* | 4/2009 | Huang | 382/167 |
| 2009/0116740 A1 | 5/2009 | Li et al. | |
| 2011/0182507 A1* | 7/2011 | Free | 382/164 |

FOREIGN PATENT DOCUMENTS

| | | |
|---|---|---|
| JP | H09-326941 | 12/1997 |
| JP | 10-173947 | 6/1998 |
| JP | 2002-223366 | 8/2002 |
| JP | 2004-072760 A | 3/2004 |
| JP | 2004-112694 | 4/2004 |
| JP | 2004-192614 A | 7/2004 |
| JP | 2004-254303 | 9/2004 |
| JP | 2004-320723 | 11/2004 |
| JP | 2005-197996 | 7/2005 |
| JP | 2005-354314 | 12/2005 |
| JP | 2006-80746 | 3/2006 |
| JP | 2006-261879 A | 9/2006 |
| JP | 2006-303708 | 11/2006 |
| JP | 2007-228322 | 9/2007 |
| JP | 2008-171062 | 7/2008 |
| JP | 2009-016962 | 1/2009 |
| WO | WO 2007/010749 A1 | 1/2007 |

OTHER PUBLICATIONS

Japanese Office Action dated Nov. 9, 2010, together with English translation.

Japanese Office Action dated Dec. 14, 2010, together with English translation.

Japanese Office Action dated Mar. 22, 2011 together with English translation from Japanese patent application 2008-327428 (U.S. Appl. No. 12/647,164).

Japanese Office Action dated Feb. 8, 2011 together with English translation from Japanese patent application 2008-327427.

U.S. Office Action dated Aug. 6, 2012, received in related U.S. Appl. No. 12/647,161.

Japanese Office Action dated Dec. 14, 2010, together with English translation from Japanese patent application 2008-327428.

Japanese Official Action dated Jan. 4, 2011 together with English language translation from Japanese patent application 2008-330453.

\* cited by examiner

FIG. 6

RGB → HSV Transformation (a) max (a, b, c) = Largest Value in a, b, c
min (a, b, c) = Smallest Value in a, b, c
(R, G, B) = Pixel Value of Pixel to be Transformed in RGB Image Data
(H, S, V) = Pixel Value of Transformed Pixel (b) $V = \max(R/255, G/255, B/255)$ (c) $V \neq 0 \rightarrow S = (V - \min(R, G, B)) \div V$
$V = 0 \rightarrow S = 0$ (d) $(V - \min(R, G, B)) \neq 0$
$r = (V - R/255) \div (V - \min(R, G, B))$
$g = (V - G/255) \div (V - \min(R, G, B))$
$b = (V - B/255) \div (V - \min(R, G, B))$
$(V - \min(R, G, B)) = 0$
$r = 0, g = 0, b = 0$ (e) $V = R/255 \rightarrow H = 60 \times (b - g)$
$V = G/255 \rightarrow H = 60 \times (2 + r - g)$
$V = B/255 \rightarrow H = 60 \times (4 + g - r)$ (f) $H < 0 \rightarrow H = H + 360$

FIG. 7

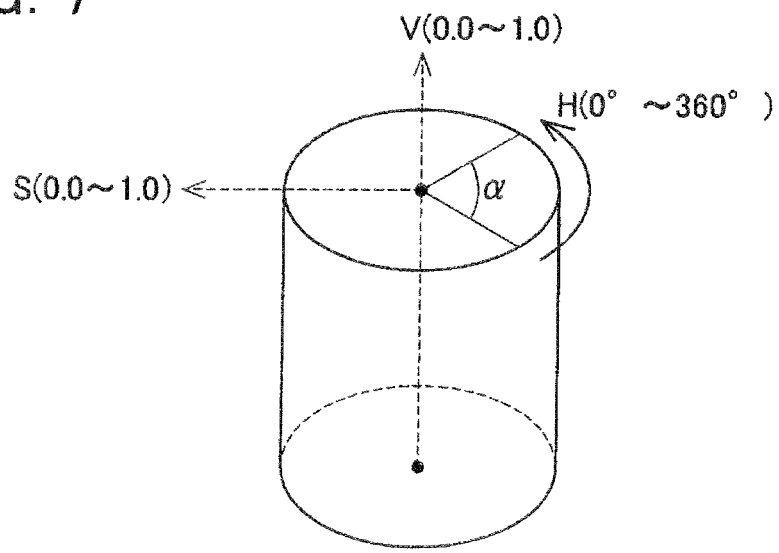

FIG. 8

Correction Mode (a) Sky Mode    H = 180~240°
                             S = 0.0~1.0
                             V = 0.0~1.0

(b) Green Mode    H = 50~170°
                             S = 0.0~1.0
                             V = 0.0~1.0

(c) Skin Mode    H = 10~40°
                             S = 0.1~0.6
                             V = 0.2~1.0

FIG. 9

HSV → vab Transformation $v = V$ $a = (S \times \cos(\frac{H \times 2\pi}{360}) + 1.0)/2.0$ $b = (S \times \sin(\frac{H \times 2\pi}{360}) + 1.0)/2.0$

FIG. 10

Formula for Calculating Correction Amount (a) $Lv = Ov + (Ov-Sv)$
$Lv < 0 \rightarrow Lv = 0, \quad Lv > 1.0 \rightarrow Lv = 1.0$ $Uv = Sv + (Sv-Ov)$
$Uv < 0 \rightarrow Uv = 0, \quad Uv > 1.0 \rightarrow Uv = 1.0$ (b) · $Sv \geq Ov$ $Curvv = 0$ \quad $(Pv < Lv)$ $Curvv = AdjO \times \dfrac{(Pv-Lv)}{(Ov-Lv)}$ \quad $(Lv < Pv < Ov)$ $Curvv = AdjO + (AdjS - AdjO) \times \dfrac{(Pv-Ov)}{(Sv-Ov)}$ \quad $(Ov \leq Pv < Sv)$ $Curvv = AdjS - \dfrac{(Pv-Sv)}{(Uv-Sv)}$ \quad $(Sv \leq Pv < Uv)$ $Curvv = 0$ \quad $(Uv \leq Pv)$ · $Sv < Ov$ $Curvv = 0$ \quad $(Pv > Lv)$ $Curvv = AdjO \times \dfrac{(Lv-Pv)}{(Lv-Ov)}$ \quad $(Ov < Pv < Lv)$ $Curvv = AdjO + (AdjS - AdjO) \times \dfrac{(Ov-Pv)}{(Ov-Sv)}$ \quad $(Sv \leq Pv < Ov)$ $Curvv = AdjS - \dfrac{(Sv-Pv)}{(Sv-Uv)}$ \quad $(Uv \leq Pv < Vv)$ $Curvv = 0$ \quad $(Uv \geq Pv)$ $AdjS = 1.0, \quad AdjO = 0.8$ (c) $Cv = Curvv \times (Sv-Pv)$
$Ca = Curva \times (Sa-Pa)$
$Cb = Curvb \times (Sb-Pb)$ $$Mv = Pv + \underbrace{Curvv \times (Sv - Pv)}_{Cv}$$

Formula for Calculating Weight "w"

(a) $\text{range} = \sqrt{(Sv-Ov)\times(Sv-Ov)+(Sa-Oa)\times(Sa-Oa)+(Sb-Ob)\times(Sb-Ob)}$ $d = \sqrt{(Sv-Pv)\times(Sv-Pv)+(Sa-Pa)\times(Sa-Pa)+(Sb-Pb)\times(Sb-Pb)}$
$\phantom{d =} + \sqrt{(Ov-Pv)\times(Ov-Pv)+(Oa-Pa)\times(Oa-Pa)+(Ob-Pb)\times(Ob-Pb)}$ (b) $w = 0.0 \qquad (d > \text{range} \times \text{sui})$ $w = \left(1.0 - (d-\text{range}) \times \left(\dfrac{1.0}{(\text{sui}-1.0)\times\text{range}}\right)\right)^{1.5} \quad (\text{range} \leq d \leq \text{range} \times \text{sui})$ (c) Sky Mode     sui = 1.75
Green Mode    sui = 2.0
Skin Mode     sui = 1.5

Ov=0.2, Sv=0.31

$$Mv = Pv + w \times Cv$$
$$Ma = Pa + w \times Ca$$
$$Mb = Pb + w \times Cb$$

FIG. 17 vab → HSV Transformation $V = v$ $S = \sqrt{(a \times 2-1) \times (a \times 2-1) + (b \times 2-1) \times (b \times 2-1)}$ $H = \dfrac{180}{\pi} \times \arctan(\dfrac{b \times 2-1}{a \times 2-1})$

FIG. 18

HSV → RGB Transformation (a)　in = Integer Portion of H/60
　　　fl = Fractional Portion of H/60

(b)　in = Even Number → fl = 1−fl (c)　$m = V \times (1-S)$, $n = V \times (1-S \times fl)$ (d)　in = 0　　　　　　　in = 3
　　　R = V × 255　　　　R = m × 255
　　　G = n × 255　　　　G = n × 255
　　　B = m × 255　　　　B = V × 255 in = 1　　　　　　　in = 4
　　　R = n × 255　　　　R = n × 255
　　　G = V × 255　　　　G = m × 255
　　　B = m × 255　　　　B = V × 255 in = 2　　　　　　　in = 5
　　　R = m × 255　　　　R = V × 255
　　　G = V × 255　　　　G = m × 255
　　　B = n × 255　　　　B = n × 255

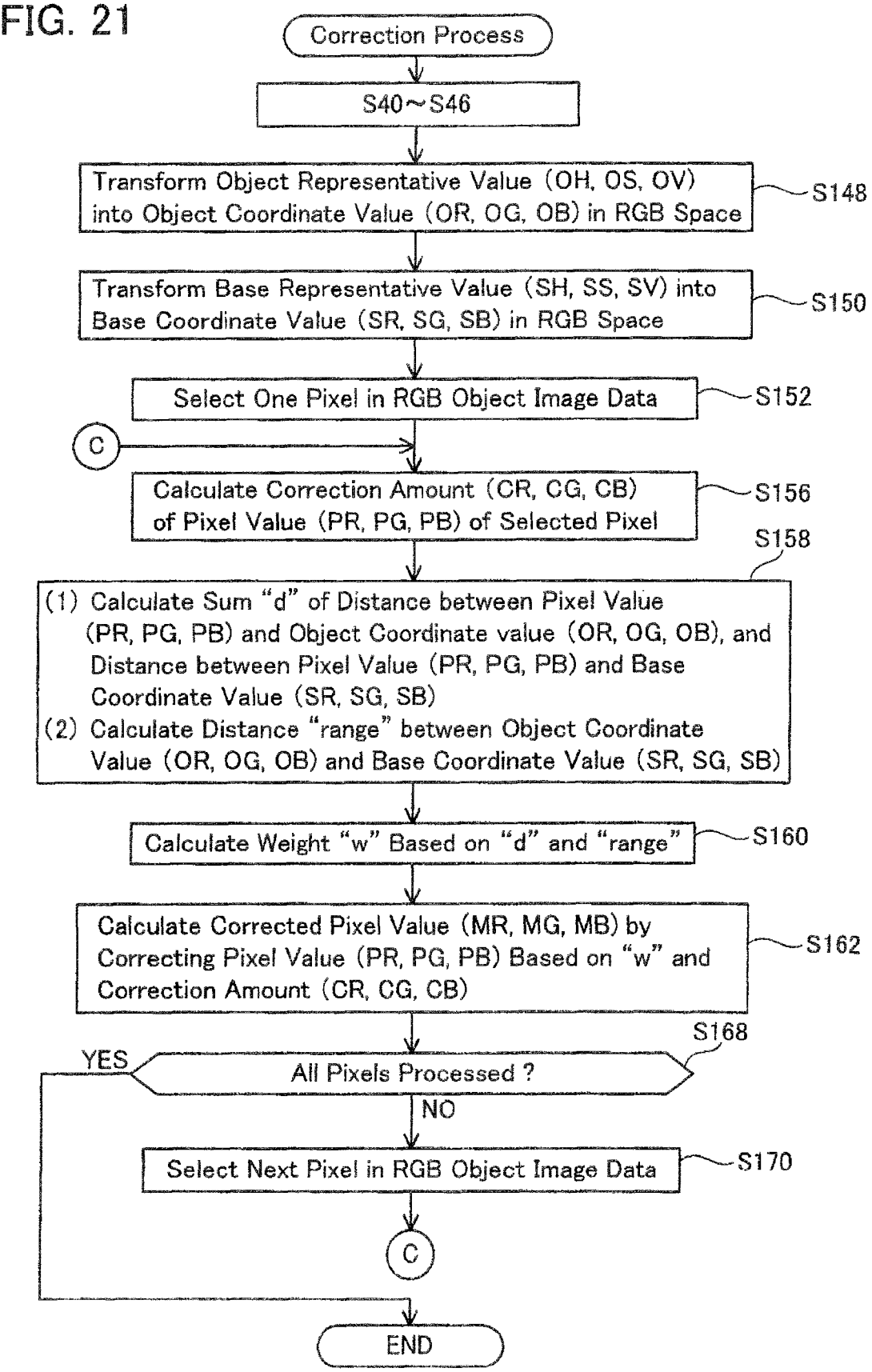

IMAGE PROCESSING DEVICE

CROSS-REFERENCE TO RELATED APPLICATIONS

This application claims priority to Japanese Patent Application No. 2008-327426, filed on Dec. 24, 2008, the contents of which are hereby incorporated by reference into the present application. This application also claims priority to Japanese Patent Application No. 2008-327427, filed on Dec. 24, 2008, the contents of which are hereby incorporated by reference into the present application.

TECHNICAL FIELD

The present description discloses image processing technology for correcting object image data by utilizing base image data.

DESCRIPTION OF RELATED ART

There is a conventional technology for correcting object image data by utilizing base image data. With this technology, image processing parameters are determined according to the tendency of image reproduction (for example, hue such as skin color, blue, and green) of the base image data, and object image data is corrected based on the image processing parameters.

SUMMARY

The inventor of this application is engaged in the development of a method for correcting a color within a particular range of hue of the object image data so as to approach a color (e.g., blue) within the particular range of hue of the base image data. The inventor has discovered that in a case where the color in the particular range of hue of the object image data is corrected, the object image data sometimes cannot be adequately corrected.

In the present description, a technology is provided that enables adequate correction of a particular range of hue of object image data by utilizing base image data.

One aspect of techniques disclosed in the present specification is an image processing device for creating corrected image data by correcting object image data utilizing base image data. The image processing device may comprise a first determination unit, a first calculation unit, a second determination unit, a second calculation unit, and a correction unit. The first determination unit may be configured to determine a first polar coordinate value which is a value in a color space of a polar coordinate system. The first polar coordinate value may be a representative value which represents first pixels in the object image data, and each of the first pixels may have a hue within a particular range of hue. The first calculation unit may be configured to calculate a first orthogonal coordinate value which is a value in a color space of a first orthogonal coordinate system by executing an orthogonal transformation on the first polar coordinate value. The second determination unit may be configured to determine a second polar coordinate value which is a value in the color space of the polar coordinate system. The second polar coordinate value may be a representative value which represents second pixels in the base image data, and each of the second pixels may have a hue within the particular range of hue. The second calculation unit may be configured to calculate a second orthogonal coordinate value which is a value in the color space of the first orthogonal coordinate system by executing an orthogonal transformation on the second polar coordinate value. The correction unit may be configured to create the corrected image data by correcting the object image data such that a coordinate value of each particular pixel in the object image data approaches the second orthogonal coordinate value. The each particular pixel may be included in a surrounding area of the first orthogonal coordinate value in the color space of the first orthogonal coordinate system.

Another aspect of an image processing device may comprise a first determination unit, a second determination unit, and a correction unit. The first determination unit may be configured to determine a first representative value which represents first pixels in the object image data. Each of the first pixels may have a hue within a particular range of hue. The second determination unit may be configured to determine a second representative value which represents second pixels in the base image data. Each of the second pixels may have a hue within the particular range of hue. The correction unit may be configured to create the corrected image data by correcting the object image data such that a value of each particular pixel in the object image data approaches the second representative value. The each particular pixel may be included in a surrounding area of the first representative value. The correction unit may be configured to correct a value of a correction target pixel such that a correction amount becomes greater as a sum of a first distance and a second distance becomes smaller. The first distance may be a distance between the first representative value and the value of the correction target pixel, and the second distance may be a distance between the second representative value and the value of the correction target pixel.

BRIEF DESCRIPTION OF DRAWINGS

FIG. 6 shows mathematical formulas for transformation from RGB to HSV.

FIG. 7 shows an HSV color space.

FIG. 8 shows examples of correspondence relationship between a correction mode and an HSV range.

FIG. 9 shows mathematical formulas for transformation from HSV to vab.

FIG. 10 shows mathematical formulas for calculating a correction amount.

FIG. 13 shows mathematical formulas for calculating a parameter w.

FIG. 17 shows mathematical formulas for transformation from vab to HSV.

FIG. 18 shows mathematical formulas for transformation from HSV to RGB.

FIG. 21 shows a flowchart of a correction process of a second embodiment.

DETAILED DESCRIPTION OF THE PREFERRED EMBODIMENT

First Embodiment

Figure 1:
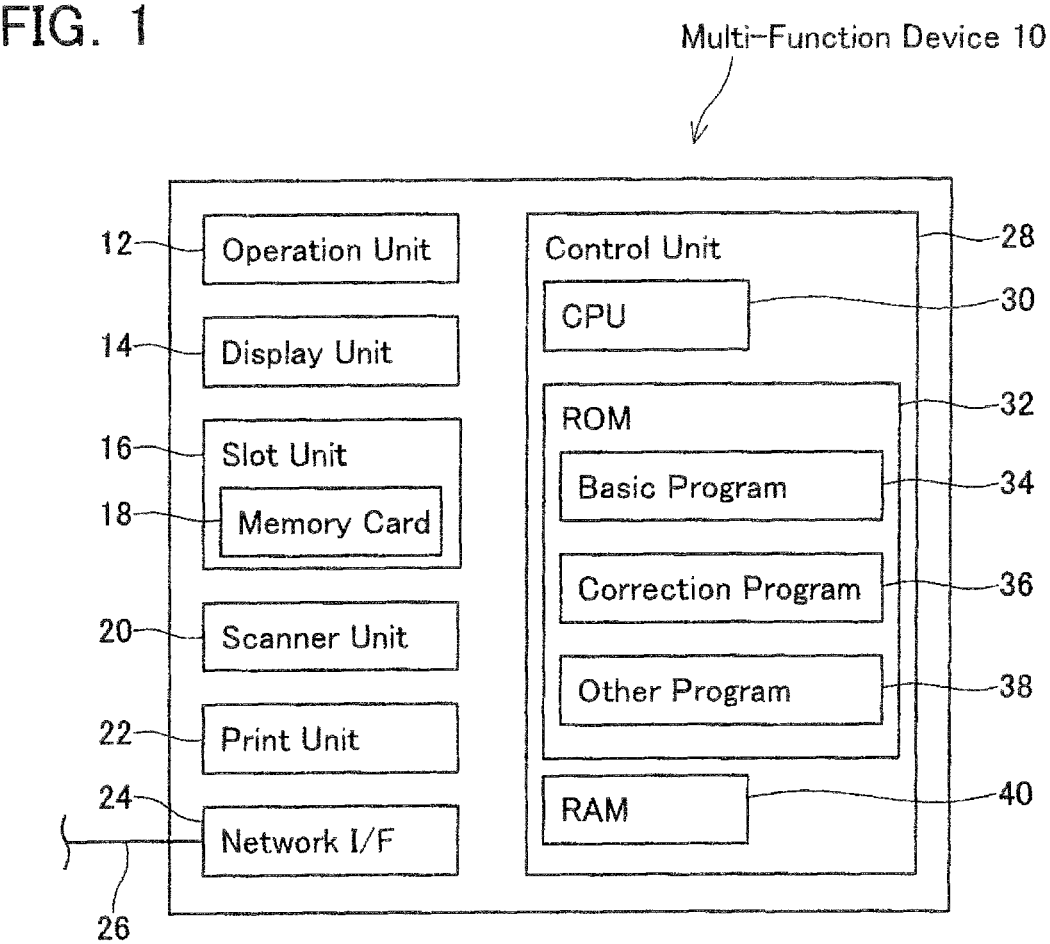
FIG. 1 shows a schematic configuration of a multi-function device.

An embodiment will be explained below with reference to the appended drawings. As shown in FIG. 1, a multi-function device 10 has an operation unit 12, a display unit 14, a slot unit 16, a scanner unit 20, a print unit 22, a network I/F 24, and a control unit 28. The operation unit 12 is constituted by a plurality of keys. A user can input various instructions and commands to the multi-function device 10 by operating the operation unit 12. The display unit 14 can display various kinds of information. The slot unit 16 has a space for accommodating a memory card 18. The user can insert the memory card 18 that stores image data into the slot unit 16. In the present embodiment, the image data stored in the memory card 18 is image data of an RGB format.

The scanner unit 20 has a scan mechanism such as CCD or CIS. The scanner unit 20 can generate image data by color scanning a document, a photograph, or the like. In the present embodiment, the image data generated by the scanner unit 20 is image data of an RGB format. The print unit 22 has a print mechanism of an ink jet type, a laser type, or the like. The print unit 22 can conduct printing on the basis of image data stored in the memory card 18 or image data generated by the scanner unit 20. Further, the print unit 22 can conduct printing on the basis of data inputted to the network I/F 24. The network I/F 24 is connected to a LAN 26.

The control unit 28 has a CPU 30, a ROM 32, and a RAM 40. The CPU 30 executes processing of various types according to programs 34 to 38 stored in the ROM 32. The ROM 32 stores various programs 34 to 38. A basic program 34 is a program for controlling basic operation of the multi-function device 10. The basic program 34 includes e.g., a program for generating data to be displayed on the display unit 14. Further, the basic program 34 includes e.g., a program for controlling the scanner unit 20, the print unit 22, and the like. A correction program 36 is a program for correcting the image data. The contents of processing executed by the CPU 30 according to the correction program 36 will be described below in greater detail. A program 38 is a program other than the programs 34 and 36. The RAM 40 can temporarily store the data generated in the process in which the CPU 30 executes the processing.

The multi-function device 10 of the present embodiment can correct the image data stored in the memory card 18 (image data selected by the user) by using the image data which the scanner unit 20 has generated. More specifically, the multi-function device 10 can correct a color within a hue of the image data stored in the memory card 18 so that the aforesaid color approaches a corresponding color within a hue of the image data (which is a hue selected by the user) generated by the scanner unit 20.

Figure 2:
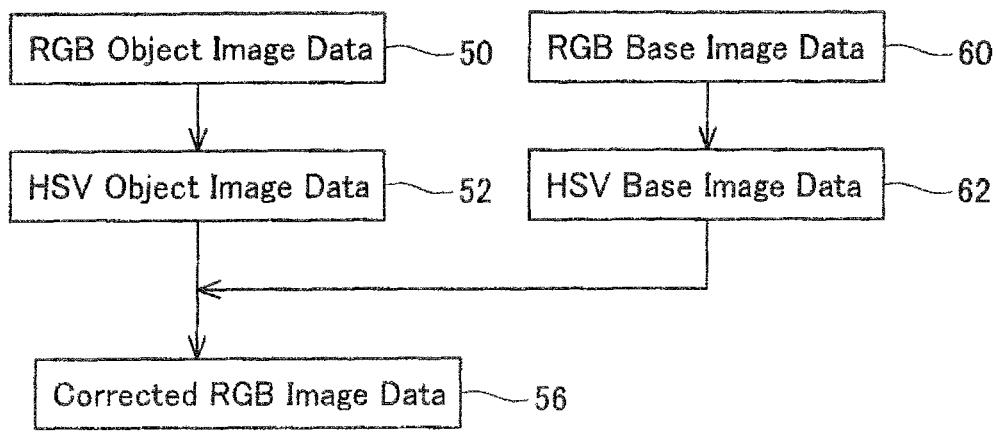
FIG. 2 briefly illustrates how image data is corrected.

The image data that is the object of correction (image data stored in the memory card 18) will be referred to hereinbelow as "RGB object image data". The image data that is used as a reference base for correction (image data generated by the scanner unit 20) will be referred to hereinbelow as "RGB base image data". The processing will be described below in greater detail. Here, the procedure of correcting the RGB object image data 50 will be explained in a simple manner using FIG. 2.

The RGB object image data 50 has a plurality of pixels. The value of each pixel is specified by a value in a color space (sometimes referred to hereinbelow as "RGB color space") of a three-dimensional orthogonal coordinate system. More specifically, the value of each pixel is specified by a value (0 to 255) indicating R (red), a value (0 to 255) indicating G (green), and a value (0 to 255) indicating B (blue). The multi-function device 10 transforms the RGB object image data 50 intro image data 52 in an HSV format. The image data 52 will be referred to hereinbelow as "HSV object image data 52". The multi-functional device 10 generates the HSV object image data 52 by transforming the value of each pixel (orthogonal coordinate value) constituting the RGB object image data 50 into a polar coordinate value. The number of pixels of the HSV object image data 52 is equal to the number of pixels of the RGB object image data 50. The value of each pixel of the HSV object image data 52 is specified by a value in a color space (sometimes referred to hereinbelow as "HSV color space") of a cylindrical polar coordinate system. More specifically, the value of each pixel is specified by a value (0 to 360° indicating a hue (H), a value (0 to 1.0) indicating a saturation (S), and a value (0 to 1.0) indicating a brightness (V). Generally, V of HSV means "value", however "brightness" is utilized instead of "value" in the present specification.

Similarly to the above-described procedure of transforming the RGB object image data 50 into the HSV object image data 52, the multi-function device 10 transforms RGB base image data 60 into image data 62 in the HSV format. The image data 62 will be referred to hereinbelow as "HSV base image data 62". The value of each pixel of the RGB base image data 60 is specified by a value in the RGB color space. Further, the value of each pixel of the HSV base image data 62 is specified by a value in the HSV color space.

The multi-function device 10 corrects the HSV object image data 52 by utilizing the HSV base image data 62 by executing a variety of the below-described processing operations. As a result, corrected image data 56 is generated. The image data 56 will be referred to hereinbelow as "corrected RGB image data 56". The value of each pixel of the corrected RGB image data 56 is specified by a value in the RGB color space.

Figure 3:
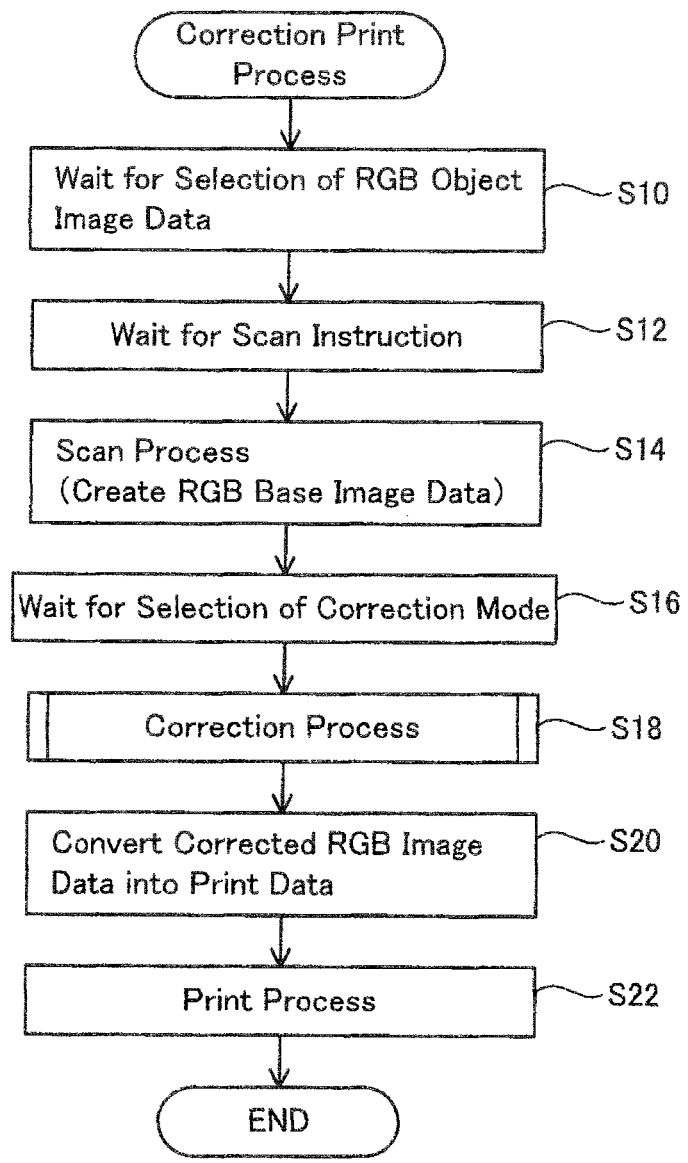
FIG. 3 shows a flowchart of a correction print process.

The contents of a correction print process executed by the multi-function device 10 will be described below in greater detail using FIG. 3. The user can select a correction print mode by operating the operation unit 12. In a case where such an operation is performed, the correction printing process is executed. The correction print process is executed by the CPU 30 according to the basic program 34 and the correction program 36. In the flowchart in FIG. 3, a process of S18 is executed according to the correction program 36, and the other processes are executed according to the basic program 34.

The user can select one image data from among a plurality of image data stored in the memory card 18 by operating the operation unit 12. The selected image data becomes the image data that is the object of correction (i.e., the RGB object image data 50). The CPU 30 stands by until the RGB object image data 50 is selected (S10).

The user can cause the scanner unit 20 to scan base image (e.g., a photograph) that is to be used for correcting the RGB object image data 50 by operating the operation unit 12. The CPU 30 stands by until this operation is executed (S12). Where this operation is executed by the user, the CPU 30 causes the scanner unit 20 to conduct scanning (S14). As a result, the scanner unit 20 color-scans the base image selected by the user, thereby generating the image data (i.e., the RGB base image data 60).

The CPU 30 then displays texts showing a plurality of correction modes on the display unit 14. More specifically, the CPU 30 displays the texts of "Sky Mode", "Green Mode", and "Skin Mode" on the display unit 14. Each correction mode will be briefly explained below. The sky mode is a mode for correcting the color in a blue hue of the RGB object image data 50 so as to approach the color in the blue hue of the RGB base image data 60. The green mode is a mode for correcting the color in a green hue of the RGB object image data 50 so as to approach the color in the green hue of the RGB base image data 60. The skin mode is a mode for correcting the color in a skin hue of the RGB object image data 50 so as to approach the color in the skin hue of the RGB base image data 60. The user can select one correction mode from the three correction modes displayed on the display unit 14 by operating the operation unit 12. The CPU 30 stands by until this operation is executed (S16). Information indicating the correction mode selected by the user is stored in the RAM 40.

The CPU 30 then executes a correction process (S18). The contents of the correction process will be described below in greater detail. The corrected RGB image data 56 is obtained by the correction process. The CPU 30 converts the corrected RGB image data 56 into printing data (CMYK-format bitmap data) (S20). Then, the CPU 30 causes the print unit 22 to conduct printing based on the printing data generated in S20 (S22). As a result, the print unit 22 conducts printing on a printing medium on the basis of the printing data. The user can thus obtain the printing medium with an image corresponding to the corrected RGB image data 56.

The contents of the correction process executed in S18 will be explained below in greater detail with reference to FIG. 4 and FIG. 5. The CPU 30 transforms the RGB object image data 50 into the HSV object image data 52 (S40). FIG. 6 shows mathematical formulas for transforming a coordinate value in the RGB color space into a coordinate value in the HSV color space. The CPU 30 selects one pixel (transformation target pixel) constituting the RGB object image data 50. As shown in FIG. 6(a), a coordinate value of the transformation target pixel is specified as (R, G, B), and a coordinate value in the HSV color space that is obtained by transformation from the coordinate value of the transformation target pixel is specified as (H, S, V). As shown in FIG. 6(b), the CPU 30 calculates R/255, G/255, and B/255 and specifies the largest value among them as V. Further, the CPU 30 calculates S by the mathematical formulas shown in FIG. 6(c). The CPU 30 then calculates intervening variables r, g, b by the mathematical formulas shown in FIG. 6(d). The CPU 30 calculates H by the mathematical formulas shown in FIG. 6(e). Where the H calculated herein has a negative value, the CPU 30 calculates a new H by adding 360 to the H having the negative value, as shown in FIG. 6(f). As a result, the coordinate value (H, S, V) in the HSV color space can be obtained from the coordinate value (R, G, B) of the transformation target pixel.

As clearly shown in FIG. 7, the HSV color space is a color space in a cylindrical coordinate system. Here, H (deviation angle) indicating hue is any value from 0 to 360°, and S (radius vector) indicating saturation is any value from 0 to 1.0. Further, V indicating brightness is any value from 0 to 1.0.

The CPU 30 calculates, for each of a rest of pixels of the RGB object image data 50, a coordinate value (H, S, V) in the HSV color space by the mathematical formulas shown in FIG. 6(a) to FIG. 6(f). As a result, the HSV object image data 52 is obtained. The CPU 30 stores the HSV object image data 52 in the RAM 40.

The CPU 30 then transforms the RGB base image data 60 into the HSV base image data 62 (S42). The processing of S42 is conducted by a method similar to that of the processing of the above-described S40. That is, the CPU 30 calculates, for each of all pixels of the RGB base image data 60, a coordinate value (H, S, V) in the HSV color space by the mathematical formulas shown in FIG. 6(a) to FIG. 6(f). As a result, the HSV base image data 62 is obtained. The CPU 30 stores the HSV base image data 62 in the RAM 40.

The CPU 30 then calculates a representative value from the HSV object image data 52 (S44). This representative value will be referred to hereinbelow as "object representative value (OH, OS, OV)". The processing of S44 is executed according to the correction mode selected in S16 shown in FIG. 3. FIG. 8 shows an example of a correspondence relationship between the correction mode and ranges of H, S, and V. For example, in a case where the correction mode is the sky mode, H is 180° to 240°, S is 0 to 1.0, and V is 0 to 1.0. It means that in a case where the correction mode is the sky mode, the CPU 30 calculates the representative value based on pixels having H of 180° to 240°, S of 0 to 1.0, and V of 0 to 1.0.

More specifically, in a case where the correction mode is the sky mode, the CPU 30 specifies pixels having H of 180° to 240° from among the entire pixels constituting the HSV object image data 52. Here, S and V are not taken into account. This is because the ranges of S and V in the case of the sky mode are both 0 to 1.0, and the S and V are contained in the 0 to 1.0 range for each pixel. Then, the CPU 30 specifies OH by calculating an average value of H of the specified pixels, specifies OS by calculating an average value of S of the specified pixels, and specifies OV by calculating an average value of V of the specified pixels. The object representative value (OH, OS, OV) is thereby obtained. Similarly, in a case where the correction mode selected in S16 of FIG. 3 is the green mode, the CPU 30 specifies the object representative value (OH, OS, OV) from pixels having H of 50° to 170° (see FIG. 8(b)). In a case where the correction mode selected in S16 of FIG. 3 is the skin mode, the CPU 30 specifies the object representative value (OH, OS, OV) from pixels having H of 10° to 40°, S of 0.1 to 0.6, and V of 0.2 to 1.0 (see FIG. 8(c)).

Next, the CPU 30 calculates a representative value from the HSV base image data 62 (S46). This representative value will be referred to hereinbelow as a base representative value (SH, SS, SV). The processing of S46 is executed similarly to the processing of S44. For example, in a case where the correction mode selected in S16 of FIG. 3 is the sky mode, the CPU 30 specifies pixels having H of 180° to 240° (see FIG. 8(a) from among the entire pixels constituting the HSV base image data 62. Then the CPU 30 specifies SH by calculating the average value of H of the specified pixels, specifies SS by calculating the average value of S of the specified pixels, and specifies SV by calculating the average value of V of the specified pixels. As a result, the base representative value (SH, SS, SV) is obtained.

The CPU 30 then transforms the object representative value (OH, OS, OV) specified in S44 into a coordinate value in a vab color space (S48). This coordinate value will be referred to hereinbelow as "object coordinate value (Ov, Oa, Ob)". The vab color space is a color space of a three-dimensional orthogonal coordinate system that is different from the RGB color space. The vab color space is a color space specific to the present embodiment and is not the conventional color space. The contents of the processing of S48 will be explained below with reference to FIG. 9. FIG. 9 shows mathematical formulas for transforming a coordinate value in the HSV color space into a coordinate value in the vab color space. In FIG. 9, a coordinate value of a transformation target pixel is specified as (H, S, V), and a coordinate value in the vab color space that is obtained by transformation from the transformation target value is specified as (v, a, b). Where (H, S, V) is substituted with (OH, OS, OV) and (v, a, b) is substituted with (Ov, Oa, Ob) in the mathematical formula shown in FIG. 9, mathematical formulas for obtaining the object coordinate value (Ov, Oa, Ob) can be obtained. The CPU 30 calculates the object coordinate value (Ov, Oa, Ob) by these mathematical formulas.

The CPU 30 then transforms the base representative value (SH, SS, SV) specified in S46 into a coordinate value in the vab color space (S50). This coordinate value will be referred to hereinbelow as "base coordinate value (Sv, Sa, Sb)". The processing of S50 is executed similarly to the processing of S48. Where (H, S, V) is substituted with (SH, SS, SV) and (v, a, b) is substituted with (Sv, Sa, Sb) in the mathematical formulas shown in FIG. 9, mathematical formulas for obtaining the base coordinate value (Sv, Sa, Sb) can be obtained. The CPU 30 calculates the base coordinate value (Sv, Sa, Sb) by these mathematical formulas.

The CPU 30 then selects one pixel constituting the HSV object image data 52 (S52). The coordinate value of the pixel selected in S52 is specified by (PH, PS, PV) (can also be alternatively called hereinbelow as "pixel value"). The CPU 30 transforms the coordinate value (PH, PS, PV) of the pixel selected in S52 into a coordinate value (Pv, Pa, Pb) in the vab color space (S54). The processing of S54 is executed similarly to the processing of S48. Where (H, S, V) is substituted with (PH, PS, PV) and (v, a, b) is substituted with (Pv, Pa, Pb) in the mathematical formulas shown in FIG. 9, mathematical formulas for obtaining the coordinate value (Pv, Pa, Pb) can be obtained. The CPU 30 calculates the coordinate value (Pv, Pa, Pb) by these mathematical formulas.

The CPU 30 then calculates a correction amount (Cv, Ca, Cb) for the coordinate value (Pv, Pa, Pb) (S56). FIG. 10 shows mathematical formulas for calculating the correction amount. The CPU 30 calculates Cv on the basis of the Pv calculated in S54, Ov calculated in S48, and Sv calculated in S50. First, the CPU 30 calculates a lower limit value Lv and an upper limit value Uv by the mathematical formulas shown in FIG. 10(a). Then, the CPU 30 calculates Curvv by the mathematical formulas shown in FIG. 10(b). AdjS and AdjO contained in the mathematical formulas shown in FIG. 10(b) are predetermined constants, rather than numerical values depending on Pv, Ov, and Sv. The CPU 30 then calculates Cv by the mathematical formulas shown in FIG. 10(c).

Figure 11:
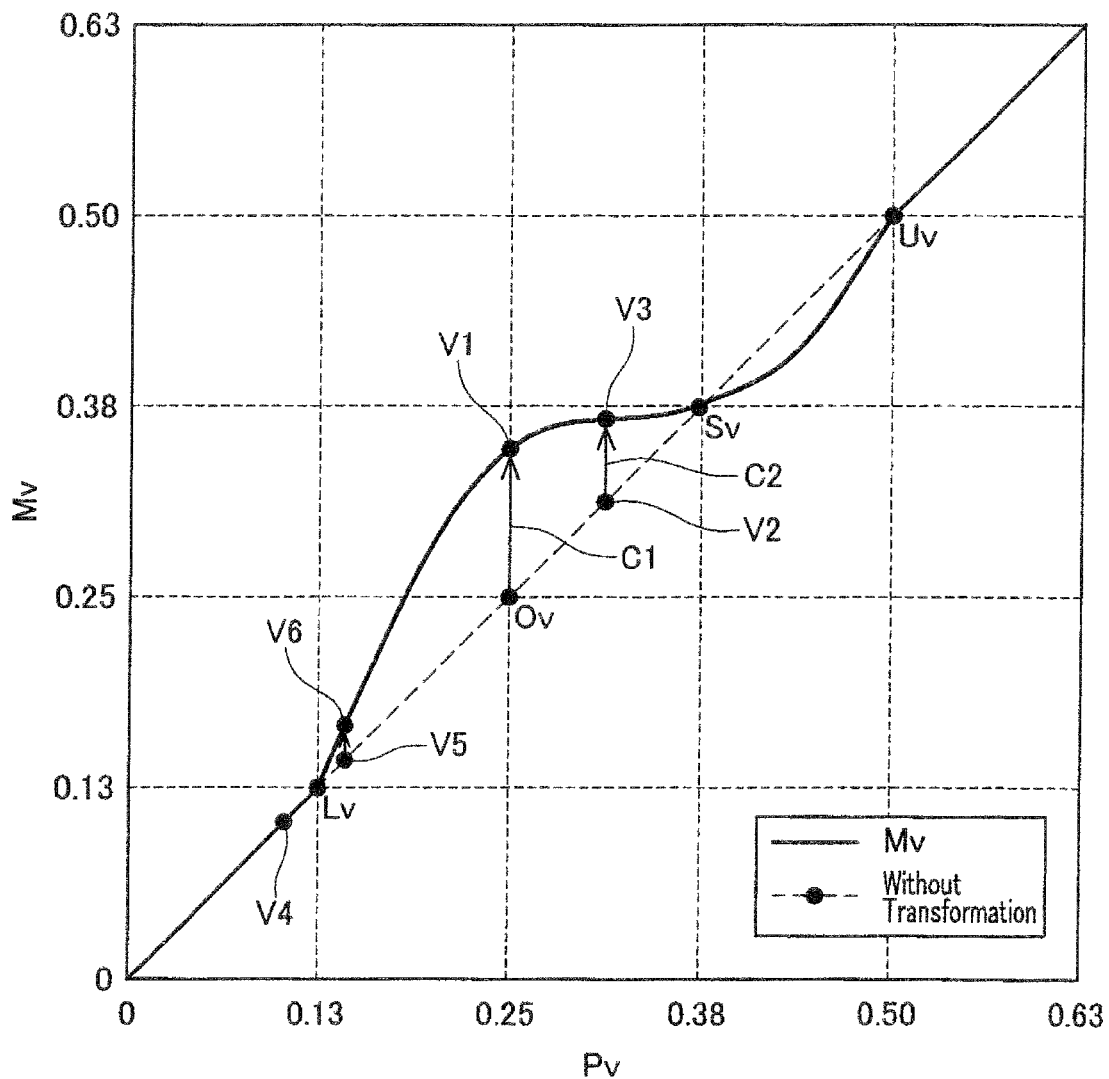
FIG. 11 shows an example of a graph in which the abscissa corresponds to Pv and the ordinate corresponds to a sum of Pv and CV.

FIG. 11 shows a graph in which the abscissa corresponds to Pv and the ordinate corresponds to a sum of Pv and Cv (referred to hereinbelow as "Mv"). In the graph shown in FIG. 11, a case in which Ov is 0.25 and Sv is 0.38 is presented by way of example. Mv is a corrected value which is obtained by correcting Pv by Cv. In the present embodiment, Mv is not obtained by merely adding Cv to Pv, as explained below in greater detail. However, in order to facilitate easier understanding of Cv, a sum of Pv and Cv is taken as Mv in FIG. 11.

As follows from the graph shown in FIG. 11, when Pv has a value between the lower limit value Lv and the upper limit value Uv, Pv follows a correction curve that approaches Sv. This correction curve is divided into an area that is convex upward and an area that is convex downward, with Sv as a boundary. For example, where Pv is equal to Ov, Cv becomes C1. Mv in this case is V1 that is a sum of Ov and C1. V1 has a value between Ov and Sv. For example, when Pv is a value V2 between Ov and Sv, Cv becomes C2. Mv in this case is V3 that is a sum of V2 and C2. V3 is a value between V2 and Sv. More specifically, V3 is a value between V1 and Sv. Thus, closer the value Pv before the correction to Sv, closer the value Mv after the correction to Sv. How the correction is performed to V1 when Pv is Ov and to V3 when Pv is V2 is also shown in FIG. 12(a).

The CPU 30 calculates the correction amount Ca by using a procedure similar to that used to calculate the correction amount Cv. The CPU 30 calculates Ca on the basis of Pa, Oa, and Sa. Ca is calculated by the mathematical formulas similar to those shown in FIG. 10. More specifically, where Lv is changed to La, Uv is changed to Ua, Ov is changed to Oa, Sv is changed to Sa, and Curvv is changed to Curva in FIG. 10(a) and FIG. 10(b), Curva can be calculated. The CPU 30 calculates Ca by the mathematical formulas shown in FIG. 10(c).

Where a graph has Pa plotted relative to the abscissa and a sum of Pa and Ca (referred to herein as Ma) plotted relative to the ordinate, a graph similar to that in FIG. 11 can be obtained. Thus, when Pa has a value between the lower limit value La and the upper limit value Ua, Pa is corrected so as to approach Sa. FIG. 12(b) shows an example of Pa correction. Where Pa is equal to Oa, Pa is corrected to a value A1 between Oa and Sa. Where Pa has a value A2 between Oa and Sa, Pa is corrected to a value A3 between A1 and Sa. Thus, closer the value of Pa before the correction to Sa, closer the value after the correction to Sa.

The CPU 30 then calculates the correction amount Cb by using a procedure similar to that used for calculating the correction amount Cv. The CPU 30 calculates Cb on the basis of Pb, Ob, and Sb. Where Lv is changed to Lb, Uv is changed to Ub, Ov is changed to Ob, Sv is changed to Sb, and Curvv is changed to Curvb in FIG. 10(a) and FIG. 10(b), Curvb can be calculated. The CPU 30 calculates Cb by the mathematical formulas shown in FIG. 10(c).

Where a graph has Pb plotted relative to the abscissa and a sum of Pb and Cb (referred to herein as Mb) plotted relative to the ordinate, a graph similar to that in FIG. 11 can be obtained. Thus, when Pb has a value between the lower limit value Lb and the upper limit value Ub, Pb is corrected so as to approach Sb. FIG. 12(c) shows an example of how Pb is corrected. Where Pb is equal to Ob, Pb is corrected to a value B1 between Ob and Sb. Where Pb has a value B2 between Ob and Sb, Pb is corrected to a value B3 between B1 and Sb. Thus, closer the value of Pb before the correction to Sb, closer the value after the correction to Sb.

Figure 12:
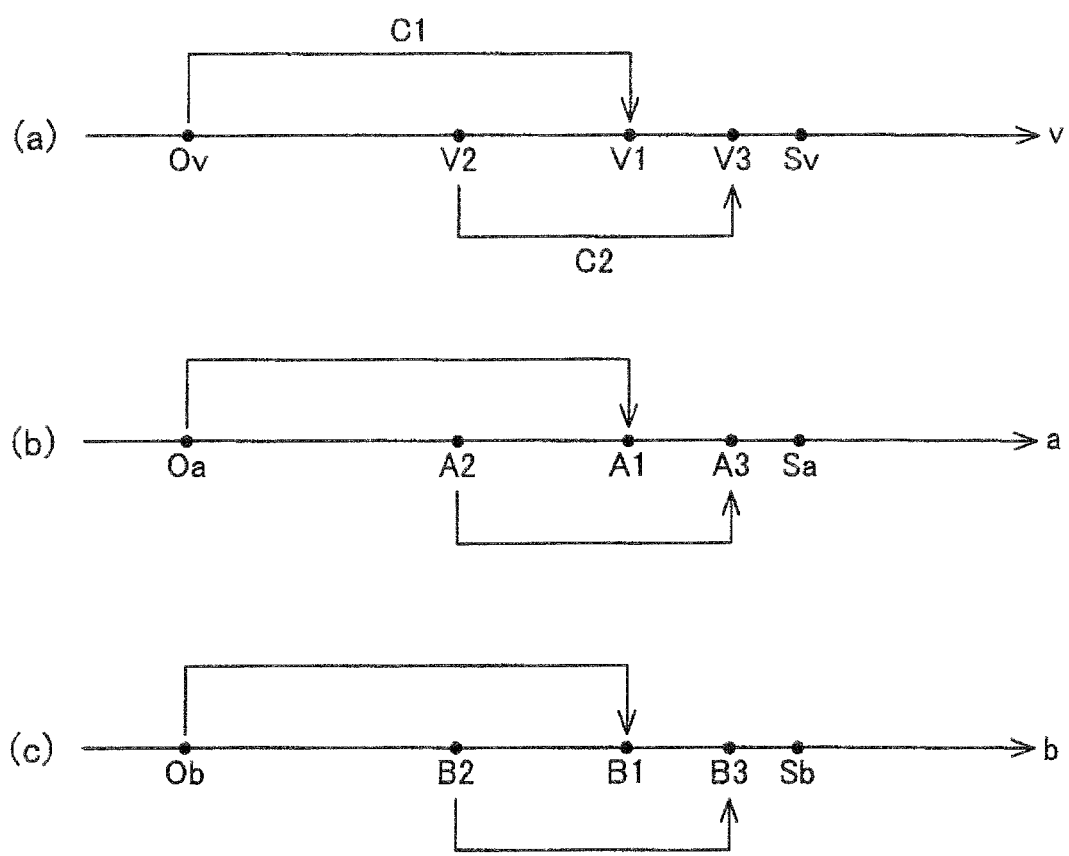
FIG. 12 schematically shows how a coordinate value is corrected.

As follows from FIG. 12, in a case where a coordinate value (Pv, Pa, Pb) of a correction target pixel (pixel selected in S52 shown in FIG. 4) is equal to the object coordinate value (Ov, Oa, Ob), the coordinate value (Pv, Pa, Pb) is corrected to a coordinate value (V1, A1, B1) that is between the object coordinate value (Ov, Oa, Ob) and base coordinate value (Sv, Sa, Sb). In a case where the coordinate value (Pv, Pa, Pb) is a coordinate value (V2, A2, B2) between the object coordinate value (Ov, Oa, Ob) and base coordinate value (Sv, Sa, Sb), the coordinate value (V2, A2, B2) is corrected to a coordinate value (V3, A3, B3) that is between the coordinate value (V1, A1, B1) and base coordinate value (Sv, Sa, Sb).

Figure 5:
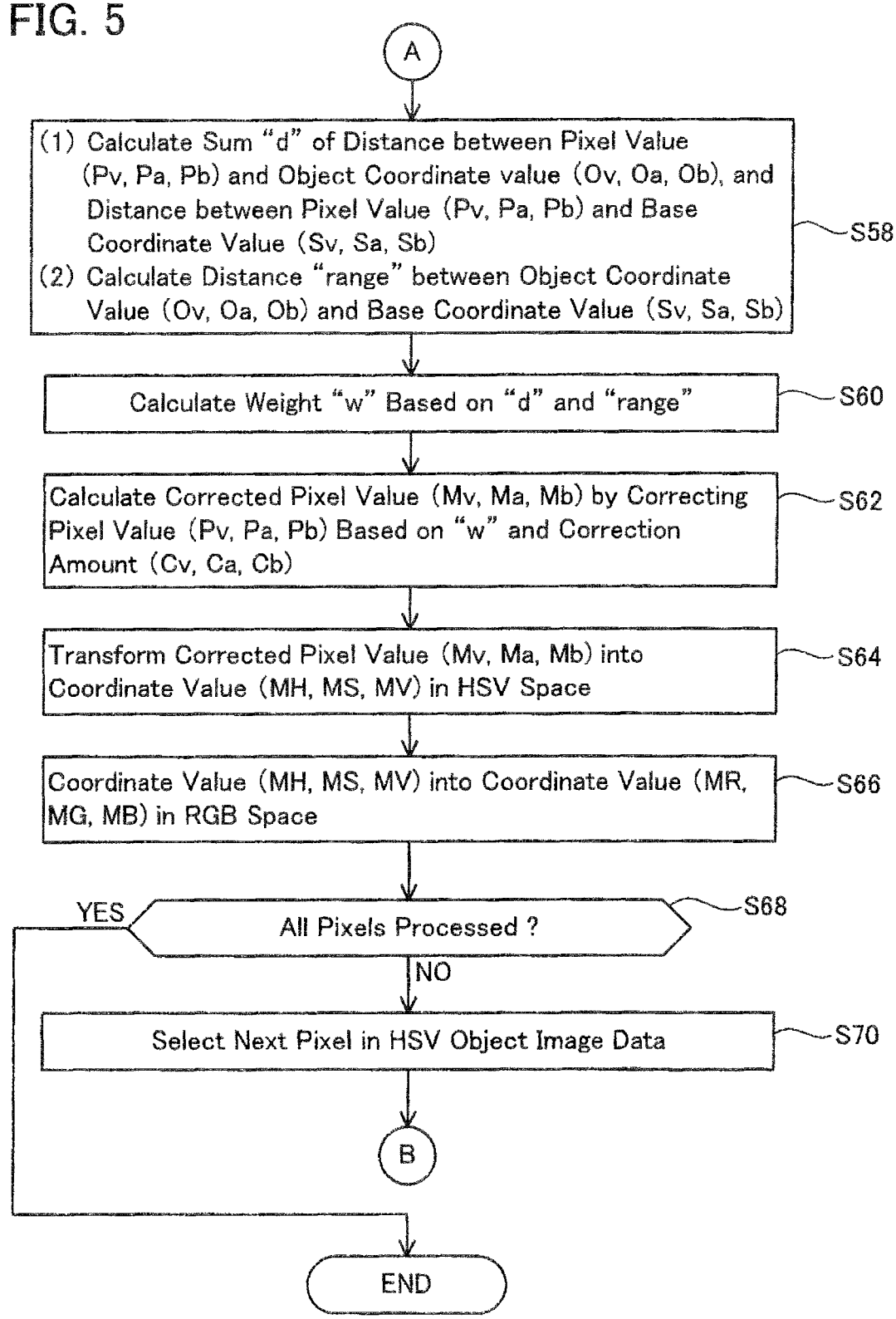
FIG. 5 shows a continuation of FIG. 4.

Once the correction amount (Cv, Ca, Cb) is calculated, the CPU 30 advances to S58 shown in FIG. 5. In S58, the CPU 30 calculates a parameter "d" and a parameter "range". FIG. 13(a) shows mathematical formulas for calculating the parameter "d" and the parameter "range". The CPU 30 calculates the parameter "d" and the parameter "range" by the mathematical formula shown in FIG. 13(a). The parameter "d" is a sum total of a distance between the coordinate value (Pv, Pa, Pb) of the correction target pixel and the object coordinate value (Ov, Oa, Ob), and a distance between the coordinate value (Pv, Pa, Pb) of the correction target pixel and the base coordinate value (Sv, Sa, Sb). The parameter "range" is a distance between the object coordinate value (Ov, Oa, Ob) and the base coordinate value (Sv, Sa, Sb).

The CPU 30 then calculates a parameter "w" on the basis of the parameter "d" and the parameter "range" (S60). FIG. 13(*b*) shows mathematical formulas for calculating "w". A parameter "sui" in the mathematical formulas shown in FIG. 13(*b*) is set correspondingly to the correction mode selected in S16 shown in FIG. 3. FIG. 13(*c*) shows a correspondence relationship between a correction mode and "sui". A "sui" in a case of the green mode is the largest, and a "sui" in a case of the skin mode is the smallest. A "sui" in a case of the sky mode is between the "sui" for the green mode and the "sui" for the skin mode. As follows from FIG. 13(*b*), where "d" is equal to "range", "w" assumes a maximum value of 1.0. Where "d" is larger than "range", "w" decreases with the increase in "d". Where "d" is larger than a value obtained by multiplying "range" and "sui", "w" assumes the smallest value of 0. According to the mathematical formulas shown in FIG. 13(*b*), it can be said that "w" decreases with the increase in "d". In other words, "w" increases with the decrease in "d".

Figures 14, 15:
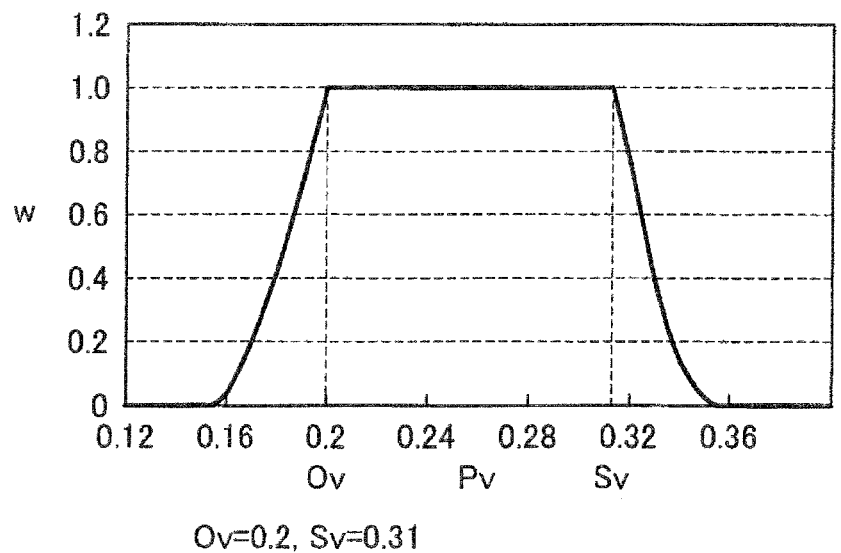
FIG. 14 shows an example of a graph in which the abscissa corresponds to Pv and the ordinate corresponds to the parameter w.
FIG. 15 shows mathematical formulas for calculating a corrected coordinate value (Mv, Ma, Mb).

FIG. 14 shows a graph in which the abscissa corresponds to Pv and the ordinate corresponds to "w". The graph in FIG. 14 illustrates by way of example a case in which Ov is 0.2 and Sv is 0.31. The graph in FIG. 14 clearly shows that when Pv is a value between Ov and Sv (i.e., when "d"="range"), "w" is 1.0. As Pv becomes less than Ov, "w" decreases smoothly. Further, as Pv becomes larger than Sv, "w" decreases smoothly. As Pv becomes farther from both Ov and Sv, "w" decreases. Conversely, as Pv comes closer to both Ov and Sv, "w" increases. A graph in which the abscissa corresponds to Pa and the ordinate corresponds to "w", and a graph in which the abscissa corresponds to Pv and the ordinate corresponds to "w" are similar to the graph shown in FIG. 14.

The CPU 30 corrects the coordinate value (Pv, Pa, Pb) of the correction target pixel on the basis of the parameter "w" and the correction amount (Cv, Ca, Cb) (S62). As a result, the corrected coordinate value (Mv, Ma, Mb) is obtained. FIG. 15 shows mathematical formulas for calculating the corrected coordinate value (Mv, Ma, Mb). The CPU 30 calculates the corrected coordinate value (Mv, Ma, Mb), by adding a coordinate value obtained by multiplying the correction amount (Cv, Ca, Cb) by the parameter "w", to the coordinate value (Pv, Pa, Pb) of the correction target pixel.

Figure 16:
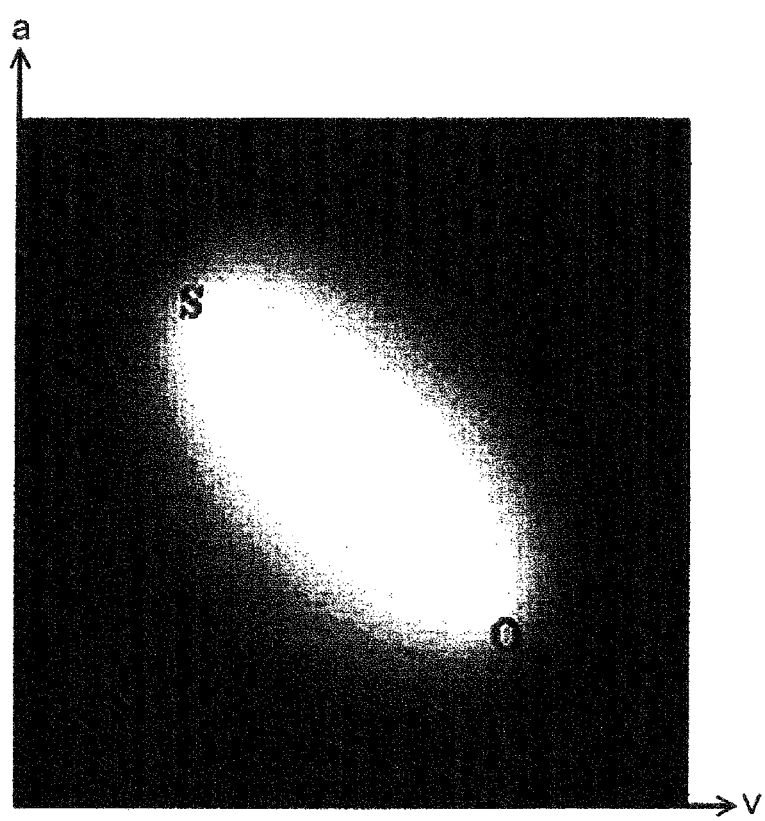
FIG. 16 schematically shows how white color is approached with a higher correction amount in a va plane.

As described hereinabove, the actual correction amount is calculated by multiplying the correction amount (Cv, Ca, Cb) by the parameter "w". The parameter "w" is calculated by the mathematical formulas shown in FIG. 13(*b*), and increases in accordance with the decrease in "d". The smaller is "d", the larger is the actual correction amount (w (Cv, Ca, Cb)). Thus, the smaller is "d", the larger is the correction of the coordinate value (Pv, Pa, Pb) of the correction target pixel. FIG. 16 shows an object coordinate value O and a base coordinate value S on the va plane. FIG. 16 means that the closer is the color to white, the larger will be the correction. Conversely speaking, FIG. 16 means that the closer is the color to black, the smaller will be the correction. A perfectly black area means that no correction is performed thereon. FIG. 16 also demonstrates that the smaller is the above-described parameter "d", the larger is the correction of the coordinate value (Pv, Pa, Pb) of the correction target pixel.

The perfectly black area in FIG. 16 is an area outside an ellipse having the object coordinate value O and base coordinate value S as two focus. Thus, in a case where the coordinate value (Pv, Pa, Pb) of the correction target pixel is present in the area outside the aforesaid ellipse, this coordinate value is not corrected. Conversely speaking, in a case where the coordinate value (Pv, Pa, Pb) of the correction target pixel is present in the area inside the ellipse, this coordinate value is corrected. FIG. 16 uses representation in the va plane, but similar drawings are also obtained with representation in the vb plane and ab plane. Thus, in a case where the coordinate value (Pv, Pa, Pb) of the correction target pixel is present within the area outside the ellipsoid in the vab space, this coordinate value is not corrected. Conversely speaking, in a case where the coordinate value (Pv, Pa, Pb) of the correction target pixel is present in the area inside the ellipsoid, this coordinate value is corrected.

Having calculated the corrected coordinate value (Mv, Ma, Mb) in S62, the CPU 30 advances to S64. In S64, the CPU 30 transforms the corrected coordinate value (Mv, Ma, Mb) into a coordinate value (MH, MS, MV) in the HSV color space. FIG. 17 shows mathematical formulas for transforming a coordinate value in the vab color space into a coordinate value in the HSV color space. In FIG. 17, a coordinate value of a transformation target pixel is specified by (v, a, b), and a coordinate value in the HSV color space that is obtained by transformation from the coordinate value of the transformation target pixel is specified by (H, S, V). Where (v, a, b) in the mathematical formulas shown in FIG. 17 is replaced with (Mv, Ma, Mb) and (H, S, V) is replaced with (ME, MS, MV), mathematical formulas for obtaining a coordinate value (MH, MS, MV) are obtained. The CPU 30 calculates the coordinate value (MH, MS, MV) by these mathematical formulas.

The CPU 30 then transforms the coordinate value (MH, MS, MV) specified in S64 into a coordinate value (MR, MG, MB) in the RGB color space (S66). FIG. 18 shows mathematical formulas for transforming a coordinate value in the HSV color space into a coordinate value in the RGB color space. In FIG. 18, a coordinate value of a transformation target pixel is specified by (H, S, V), and a coordinate value in the RGB color space that is obtained by transformation from the coordinate value of the transformation target pixel is specified as (R, G, B). Where (H, S, V) in the mathematical formulas shown in FIG. 18 is replaced with (MH, MS, MV) and (R, G, B) is replaced with (MR, MG, MB), mathematical formulas for obtaining a coordinate value (MR, MG, MB) are obtained. As shown in FIG. 18(*a*), the CPU 30 calculates intervening variables "in" and "fl" from MH. Further, as shown in FIG. 18(*b*), where the intervening variable "in" is an even number, the CPU 30 subtracts "fl" from 1 (one), and calculates new "fl". Then, the CPU 30 calculates intervening variables "m" and "n" from MS and MV by the mathematical formulas shown in FIG. 18(*c*). The CPU 30 calculates MR, MG, and MB from MV, "m", and "n" by the mathematical formulas shown in FIG. 18(*d*). As a result, the coordinate value (MR, MG, MB) in the RGB color space is obtained.

By executing the processes of S54 to S66, it is possible to correct the coordinate value (PH, PS, PV) of one pixel in the HSV object image data 52 and obtain the coordinate value (MR, MG, MB) in the RGB color space as the corrected coordinate value. The CPU 30 determines whether the processing of S54 to S66 has been executed with respect to all the pixels in the HSV object image data 52 (S68). Where the result is NO, the CPU 30 selects the next pixel in the HSV object image data 52 (S70). The CPU 30 executes the process of S54 to S66 with respect to the pixel selected in S70. Where the result of determination in S68 is YES, the correction process is completed. In this case, the corrected RGB image data 56 (see FIG. 2) in which the value of each pixel is specified by the coordinate value in the RGB color space obtained by processing of S54 to S66 is obtained.

The multi-function device 10 of the present embodiment is explained above in detail. The multi-function device 10 executes the processing in S44 and S46 of FIG. 4 in the HSV color space (see FIG. 7). For example, in S44 of FIG. 4, the multi-function device 10 specifies a group of pixels having a hue H (for example, 180° to 240° in the case of sky mode) corresponding to the correction mode desired by the user from the HSV object image data 52, and calculates the object representative value from this pixel group.

Figure 19:
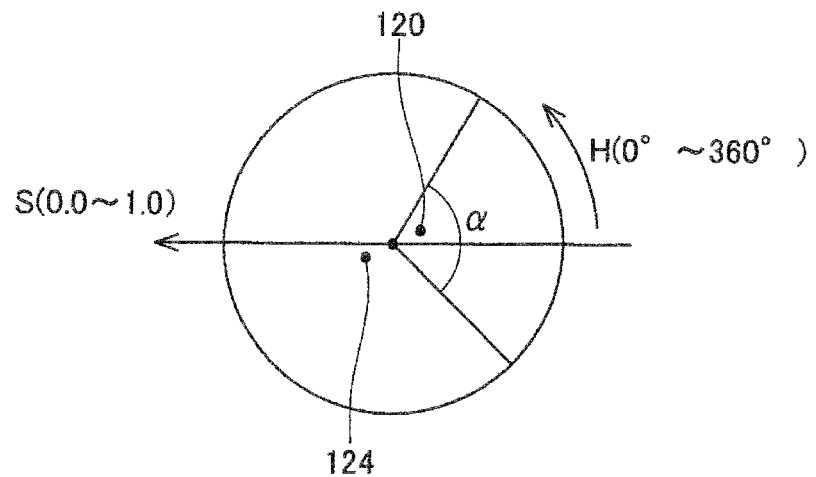
FIG. 19 shows an SH plane.
Figure 20:
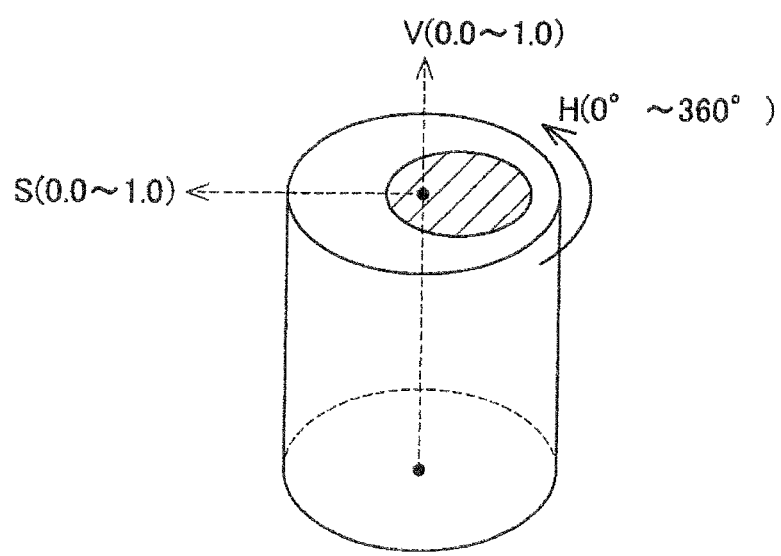
FIG. 20 shows an HSV color space.

Since the object representative value and the base representative value are calculated in the HSV color space, employing a method of correcting each pixel of the HSV object image data 52 in the HSV color space can be also considered. However, in this case, the following problems are encountered. In FIG. 19, a shows a range of hue H (for example, 180° to 240° in the case of sky mode) corresponding to the correction mode. Where the method for correcting in the HSV color space is used, when two pixels 120 and 124 with small saturations S are present in positions shown in FIG. 19, the pixel 120 is corrected, but the pixel 124 is not corrected. As a result, the two pixels 120 and 124 that practically did not differ in visible color prior to the correction differ significantly in color after the correction. In order to resolve this problem in the method of correcting in the HSV color space, it is necessary to correct the group of pixels contained in the area e.g., shown by hatching in FIG. 20. However, in order to define the area including the V axis in the HSV color space, it is necessary to define S and V for each of various H values, thus a huge amount of calculations is required.

By contrast, the multi-function device 10 of the present embodiment executes the correction in the vab color space of an orthogonal coordinate system. That is, the multi-function device 10 transforms the object representative value (OH, OS, OV) into the object coordinate value (Ov, Oa, Ob) in the vab color space (S48 in FIG. 4), and corrects the values of pixels contained in an area (area inside the ellipsoid having the object coordinate value (Ov, Oa, Ob) and base coordinate value (Sv, Sa, Sb) as two focuses) surrounding the object coordinate value (Ov, Oa, Ob). As a result, even when the pixel 124 is present that does not have a hue within a range of hue H corresponding to the correction mode, the value of this pixel 124 may be corrected. This is because there is a high possibility that a group of pixels (e.g., the pixels 122, 124) having an almost achromatic color (having extremely small saturation) is disposed adjacently each other in an orthogonal coordinate system (in this embodiment, the vab color space). Thus, it is possible to inhibit occurrence of a significant difference in post-correction colors between the two pixels 120 and 124 that practically did not have much difference in visible colors before the correction. The multi-function device 10 of the present embodiment can adequately correct the HSV object image data 52 by using the HSV base image data 62.

As shown by the mathematical formulas in FIG. 13, the multi-function device 10 has been set such that a value range ("range"×"sui") of a pixel that has to be corrected increases in accordance with the increase in the value of "sui" corresponding to the correction mode. The "sui" is the largest in the green mode, and is the smallest in the skin mode. Therefore, in a case where green color for which color variations are difficult to recognize is corrected, the value range of the pixel that has to be corrected increases, and in a case where skin color for which color variations are easy to recognize is corrected, the value range of the pixel that has to be corrected decreases. The value range of the pixel that has to be corrected is adequately set with consideration for human vision characteristic.

The correction curve shown in FIG. 11 illustrates an example in which "w" is 1.0. In the example shown in FIG. 11, V4 is not corrected, and V5 is corrected into V6. Because values of V4 and V5 are close to each other, the visible colors are similar. In a case where a pixel corresponding to V4 and a pixel corresponding to V5 are adjacent in the HSV object image data 52, the former pixel that is not corrected (that is, V=V4) and the latter pixel that is corrected (that is, V=V6) might have a significant difference in color. In the present embodiment, the following configuration is used to prevent the occurrence for such an event. Thus, the parameter "w" is used such that the correction amount increases according to a degree of decrease in a sum "d" of a distance between the object coordinate value (Ov, Oa, Ob) and the coordinate value (Pv, Pa, Pb) of the correction target pixel, and a distance between the base coordinate value (Sv, Sa, Sb) and the coordinate value (Pv, Pa, Pb) of the correction target pixel. The parameter "w" becomes smaller in accordance with the increase in "d" (see FIG. 13(b)). A pixel corresponding to V5 shown in FIG. 11 is present in a location that is far from both the object coordinate value (Ov in FIG. 11) and the base coordinate value (Sv in FIG. 11). Therefore, the correction amount for the pixel corresponding to V5 is small. As a result, even in a case where the pixel corresponding to V4 and the pixel corresponding to V5 are adjacent, occurrence of a large difference in color between these pixels can be prevented.

The multi-function device 10 is an example of "an image processing device". The RGB object image data 50, HSV object image data 52, HSV base image data 62, and corrected RGB image data 56 are the examples of "particular image data", "object image data", "base image data", and "corrected image data", respectively. The range of hue H (see FIG. 8) determined correspondingly to each correction mode is an example of "a particular range of hue". The HSV color space, vab color space, and RGB color space are the examples of "a color space of a polar coordinate system", "a color space of a first orthogonal coordinate system (an orthogonal coordinate system)", and "a second orthogonal coordinate system", respectively. The object representative value (OH, OS, OV) and object coordinate value (Ov, Oa, Ob) are the examples of "a first polar coordinate value" and "a first orthogonal coordinate value (a first representative value)", respectively. The base representative value (SH, SS, SV) and base coordinate value (Sv, Sa, Sb) are the examples of "a second polar coordinate value" and "a second orthogonal coordinate value (a second representative value)", respectively. The processes of S44 and S48 in FIG. 4 are examples of processes executed by "a first determination unit" and "a first calculation unit", respectively. The processes of S46 and S50 in FIG. 4 are examples of processes executed by "a second determination unit" and "a second calculation unit", respectively. Further, the processes of S52 to S56 in FIG. 4 and S58 to S70 in FIG. 5 are examples of processes executed by "a correction unit". The area of w>0 (area with a color other than black in FIG. 16) determined by the mathematical formulas shown in FIG. 13 is an example of "a surrounding area" and "a particular area".

The parameter "d" is an example of "a sum of a first distance and a second distance". (V1, A1, B1), (V2, A2, B2), (V3, A3, B3) in FIG. 12 are the examples of "a third orthogonal coordinate value (a first coordinate value)", "a fourth orthogonal coordinate value (a second coordinate value)", and "a fifth orthogonal coordinate value (a third coordinate value)", respectively. The process of S40 in FIG. 4 is an example of a process executed by "a transformation unit". Further, the coordinate value (Pv, Pa, Pb) and coordinate value (MH, MS, MV) are the examples of "a particular orthogonal coordinate value" and "a particular polar coordinate value", respectively.

Second Embodiment

The second embodiment will be described below. In the present embodiment, the contents of the correction process of S18 in FIG. 3 are different from those of the first embodiment. In the first embodiment, the coordinate value of the correction target pixel is corrected in the vab color space. By contrast, in the present embodiment, the coordinate value of the correction target pixel is corrected in the RGB color space.

FIG. 21 is a flowchart of a correction process of the present embodiment. By executing the processes of S40 to S46 in FIG. 4, the CPU 30 calculates the object representative value (OH, OS, OV) and also calculates the base representative value (SH, SS, SV). Then, the CPU 30 transforms the object representative value (OH, OS, OV) into an object coordinate value (OR, OG, OB) in the RGB color space (S148). Further, the CPU 30 transforms the base representative value (SH, SS, SV) into an object coordinate value (SR, SG, SB) in the RGB color space (S150). The processes of S148 and S150 are executed by the mathematical formulas shown in FIG. 18.

Then, the CPU 30 selects one pixel (correction target pixel) constituting the RGB object pixel data 50 (S152). The coordinate value of the pixel selected in S152 will be represented hereinbelow as (PR, PG, PB). The CPU 30 calculates a correction amount (CR, CG, CB) of the coordinate value (PR, PG, PB) of the correction target pixel selected in S152. The correction amount is calculated by the mathematical formulas shown in FIG. 10. More specifically, CR can be calculated by changing Lv to LR, changing Uv to UR, changing Ov to OR, changing Sv to SR, changing Pv to PR, changing Curvv to CurvR, and Cv to CR in FIG. 10. In the present embodiment, the description of "Lv=1.0 when Lv>1.0" in FIG. 10(a) is changed to "LR=255 when LR>255". Further, the description of "Uv=1.0 when Uv>1.0" in FIG. 10(a) is changed to "UR=255 when UR>255". A method for calculating CG and CB is similar to that for calculating CR.

The CPU 30 then calculates a parameter "d" and a parameter "range" (S158). The parameter "d" and the parameter "range" are calculated by the mathematical formulas shown in FIG. 13(a). The parameter "d" is a sum of a distance between the coordinate value (PR, PG, PB) of the correction target pixel and the object coordinate value (OR, OG, OB) and a distance between the coordinate value (PR, PG, PB) of the correction target pixel and the base coordinate value (SR, SG, SB). The parameter "range" is a distance between the object coordinate value (OR, OG, OB) and the base coordinate value (SR, SG, SB).

The CPU 30 then calculates a parameter "w" on the basis of the parameter "d" and the parameter "range" (S160). The parameter "w" is calculated by the mathematical formulas shown in FIG. 13(b). The CPU 30 then corrects the coordinate value (PR, PG, PB) of the correction target pixel on the basis of the parameter "w" and the correction amount (CR, CG, CB) (S162). As a result, the corrected coordinate value (MR, MG, MB) is obtained. In the processing of S162, calculations are conducted by the mathematical formulas shown in FIG. 15. Thus, the CPU 30 calculates the corrected coordinate value (MR, MG, MB) by adding a coordinate value obtained by multiplying the correction amount (CR, CG, CB) by the parameter "w" to the coordinate value (PR, PG, PB) of the correction target pixel.

Once the corrected coordinate value (MR, MG, MB) has been calculated in S162, the CPU 30 advances to S168. In S168, the CPU 30 determines whether the processes of S156 to S162 have been executed with respect to all the pixels in the RGB object image data 50. Where the result is NO, the CPU 30 selects the next pixel in the RGB object image data 50 (S170) and executes the processes of S156 to S162. Where the result of determination in S168 is YES, the correction process is completed. In this case, the corrected RGB image data 56 (see FIG. 2) is obtained.

In the first embodiment, it is necessary to conduct a process of transforming the coordinate value (Mv, Ma, Mb) into the coordinate value (MH, MS, MV) in the HSV color space (S64) and transform the coordinate value (MH, MS, MV) into the coordinate value (MR, MG, MB) in the RGB color space (S66) after the corrected coordinate value (Mv, Ma, Mb) has been calculated in S62 of FIG. 5. By contrast, in the present embodiment, the transformation process is unnecessary because the coordinate value (MR, MG, MB) obtained by the process of S162 in FIG. 21 is a coordinate value in the RGB color space.

The above-described embodiments are illustrative examples, and these embodiments can be changed in a variety of ways. The variation examples of the embodiments are described below.

Figure 4:
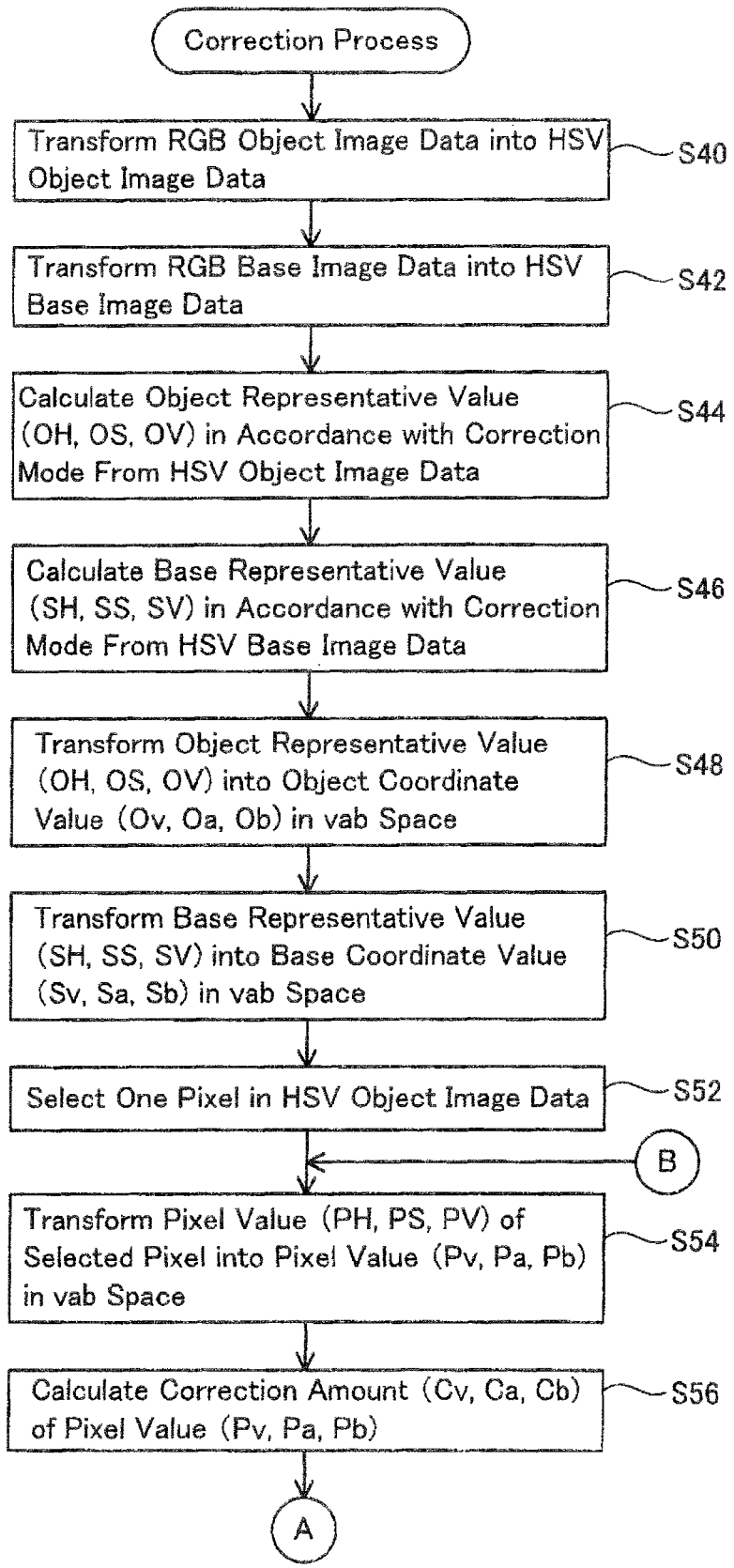
FIG. 4 shows a flowchart of a correction process.

(1) In the first embodiment, in a case where the parameter "w" calculated in S60 in FIG. 5 is 0, no correction is performed with respect to the pixel selected in S52 in FIG. 4. Therefore, in a case where the parameter "w" is 0, S62 and S64 in FIG. 5 may be skipped. In this case, the CPU 30 may execute process of S66 in FIG. 5 by taking the coordinate value (PH, PS, PV) of the pixel selected in S52 in FIG. 4 as the coordinate value (MH, MS, MV). Here, if the coordinate value corresponding to the coordinate value (PH, PS, PV) in the RGB object image data 50 has been already clarified, S66 may be skipped.

(2) In the above-described embodiments, image data stored in the memory card 18 is taken as the RGB object image data 50 that is the object of correction. However, other image data may be also taken as the RGB object image data 50. For example, image data generated by the scanner unit 20 may be also taken as the RGB object image data 50. Further, in the above-described embodiments, image data generated by the scanner unit 20 is taken as the RGB base image data 60. However, other image data may be also taken as the RGB base image data 60. For example, image data stored in the memory card 18 may be taken as the RGB base image data 60.

(3) In the above-described embodiments, a color space in a cylindrical coordinate system (HSV color space) is used as the color space of the polar coordinate system. However, a color space of a spherical coordinate system may be also used as the color space of the polar coordinate system.

(4) In the above-described embodiments, a range of hue that has to be corrected is determined correspondingly to the correction mode selected by the user. However, in the correction print process, only one correction mode may be present (that is, the range of hue that has to be corrected may be fixed). Further, in the correction print process, the correction process may be successively executed with respect to each of a plurality of correction modes (such as the three correction modes in the above-described embodiments). In this case, the multi-function device 10 may display a plurality of image data after the correction, may allow the user to select one image data from among these image data, and may execute printing on the basis of the image data selected by the user.

(5) In each of the above-described embodiments, the correction is not necessarily conducted by using "w". Thus, in the mathematical formulas shown in FIG. 15, "w" may be 1 at all times. In this case, only the value between the lower limit value Lv and upper limit value Uv shown in FIG. 11 is corrected, and other values are not corrected (similar correction is also in the case of the a axis and b axis of the vab color space). In this variation example, the area between the lower limit value Lv and upper limit value Uv is an example of "a surrounding area".

(6) Each pixel in object image data may be specified by a value in a color space of an orthogonal coordinate system (for example, first orthogonal coordinate system, second orthogonal coordinate system, and the like), and alternately, may be specified by a value in a polar coordinate system. In the former case, a first polar coordinate value and second polar coordinate value may be determined after the value of each pixel in the object image data has been transformed into the value in the color space of the polar coordinate system. Further, in the latter case, the correction may be performed after the value of each pixel in the object image data has been transformed into the value in the color space of the first orthogonal coordinate system.

(7) Further, "a surrounding area" having a shape other than those described above may be used alternately. For example, the surrounding area may be an area that includes "a first orthogonal coordinate value (a first representative value)" and does not include "a second orthogonal coordinate value (a second representative value)".

(8) Further, "a first orthogonal coordinate value (a first representative value)" and "a second orthogonal coordinate value (a second representative value)" may not be an average, and may be a central value.

(9) The correction program 36 illustrated by FIG. 1 may or may not be installed in the multi-function device 10 at a stage of shipping the multi-function device 10. In the latter case, the correction program 36 may be downloaded into the multi-function device 10 from the Internet or may be installed in the multi-function device 10 from a computer readable medium. A computer readable medium that stores the correction program 36 is also a useful feature.

What is claimed is:

1. An image processing device for creating corrected image data by correcting object image data utilizing base image data, the image processing device comprising:
   a first determination unit configured to determine a first polar coordinate value which is a value in a color space of a polar coordinate system, the first polar coordinate value being a representative value which represents first pixels in the object image data, each of the first pixels having a hue within a particular range of hue;
   a first calculation unit configured to calculate a first orthogonal coordinate value which is a value in a color space of a first orthogonal coordinate system by executing an orthogonal transformation on the first polar coordinate value;
   a second determination unit configured to determine a second polar coordinate value which is a value in the color space of the polar coordinate system, the second polar coordinate value being a representative value which represents second pixels in the base image data, each of the second pixels having a hue within the particular range of hue;
   a second calculation unit configured to calculate a second orthogonal coordinate value which is a value in the color space of the first orthogonal coordinate system by executing an orthogonal transformation on the second polar coordinate value; and
   a correction unit configured to create the corrected image data by correcting the object image data such that a coordinate value of each particular pixel in the object image data approaches the second orthogonal coordinate value, wherein the each particular pixel is included in a surrounding area of the first orthogonal coordinate value in the color space of the first orthogonal coordinate system.

2. The image processing device as in claim 1, wherein the surrounding area is a particular area including both of the first orthogonal coordinate value and the second orthogonal coordinate value.

3. The image processing device as in claim 2, wherein the particular area is an area in an ellipsoid having the first orthogonal coordinate value and the second orthogonal coordinate value as two focuses.

4. The image processing device as in claim 1, wherein a size of the surrounding area determined in a case of the particular range being a first range is different from a size of the surrounding area determined in a case of the particular range being a second range which is different from the first range.

5. The image processing device as in claim 1, wherein the correction unit is configured to correct a coordinate value in the color space of the first orthogonal coordinate system of a correction target pixel such that a correction amount becomes greater as a sum of a first distance and a second distance becomes smaller, the first distance being a distance between the first orthogonal coordinate value and a coordinate value in the color space of the first orthogonal coordinate system of the correction target pixel, and the second distance being a distance between the second orthogonal coordinate value and the coordinate value in the color space of the first orthogonal coordinate system of the correction target pixel.

6. The image processing device as in claim 1, wherein
in a case where a coordinate value in the color space of the first orthogonal coordinate system of a correction target pixel is identical to the first orthogonal coordinate value, the correction unit is configured to correct the coordinate value in the color space of the first orthogonal coordinate system of the correction target pixel into a third orthogonal coordinate value that is between the first orthogonal coordinate value and the second orthogonal coordinate value, and
in a case where the coordinate value in the color space of the first orthogonal coordinate system of the correction target pixel is a fourth orthogonal coordinate value that is between the first orthogonal coordinate value and the second orthogonal coordinate value, the correction unit is configured to correct the coordinate value in the color space of the first orthogonal coordinate system of the correction target pixel into a fifth orthogonal coordinate value that is between the third orthogonal coordinate value and the second orthogonal coordinate value.

7. The image processing device as in claim 1, wherein the first determination unit is configured to determine the first polar coordinate value by calculating an average value of a coordinate value in the color space of the polar coordinate system of each pixel included in the first pixels, and the second determination unit is configured to determine the second polar coordinate value by calculating an average value of a coordinate value in the color space of the polar coordinate system of each pixel included in the second pixels.

8. The image processing device as in claim 1, further comprising:

a transformation unit configured to transform particular image data into the object image data, wherein each pixel in the particular image data is specified by a coordinate value in a color space of a second orthogonal coordinate system which is different from the first orthogonal coordinate system, and each pixel in the object image data is specified by a coordinate value in the color space of the polar coordinate system, wherein the correction unit is configured to create the corrected image data in which each pixel is specified by a coordinate value in the color space of the second orthogonal coordinate system by executing:

transforming a coordinate value of each pixel in the object image data into a particular orthogonal coordinate value that is a coordinate value in the color space of the first orthogonal coordinate system;

correcting each particular orthogonal coordinate value included in the surrounding area such that the each particular orthogonal coordinate value approaches the second orthogonal coordinate value;

transforming each corrected particular orthogonal coordinate value into a particular polar coordinate value that is a coordinate value in the color space of the polar coordinate system; and transforming each particular polar coordinate value into an orthogonal coordinate value which is a coordinate value in the color space of the second orthogonal coordinate system.

9. A non-transitory computer readable medium including a computer program for creating corrected image data by correcting object image data utilizing base image data, the computer program including instructions for ordering a computer to perform:

determining a first polar coordinate value which is a value in a color space of a polar coordinate system, the first polar coordinate value being a representative value which represents first pixels in the object image data, each of the first pixels having a hue within a particular range of hue;

calculating a first orthogonal coordinate value which is a value in a color space of a first orthogonal coordinate system by executing an orthogonal transformation on the first polar coordinate value;

determining a second polar coordinate value which is a value in the color space of the polar coordinate system, the second polar coordinate value being a representative value which represents second pixels in the base image data, each of the second pixels having a hue within the particular range of hue;

calculating a second orthogonal coordinate value which is a value in the color space of the first orthogonal coordinate system by executing an orthogonal transformation on the second polar coordinate value; and creating the corrected image data by correcting the object image data such that a coordinate value of each particular pixel in the object image data approaches the second orthogonal coordinate value, wherein the each particular pixel is included in a surrounding area of the first orthogonal coordinate value in the color space of the first orthogonal coordinate system.

* * * * *